(12) United States Patent
Arora et al.

(10) Patent No.: US 11,662,827 B2
(45) Date of Patent: May 30, 2023

(54) GESTURE RECOGNITION USING A MOBILE DEVICE

(71) Applicant: Sony Semiconductor Solutions Corporation, Kanagawa (JP)

(72) Inventors: Varun Arora, Stuttgart (DE); Avasare Prabhat, Stuttgart (DE)

(73) Assignee: Sony Semiconductor Solutions Corporation, Kanagawa (JP)

(*) Notice: Subject to any disclaimer, the term of this patent is extended or adjusted under 35 U.S.C. 154(b) by 0 days.

(21) Appl. No.: 16/958,024

(22) PCT Filed: Dec. 27, 2018

(86) PCT No.: PCT/EP2018/097032
§ 371 (c)(1),
(2) Date: Jun. 25, 2020

(87) PCT Pub. No.: WO2019/134888
PCT Pub. Date: Jul. 11, 2019

(65) Prior Publication Data
US 2021/0064147 A1   Mar. 4, 2021

(30) Foreign Application Priority Data
Jan. 3, 2018   (EP) .................................. 18150191

(51) Int. Cl.
*G06F 3/01*   (2006.01)
*G06F 3/0346*   (2013.01)
(Continued)

(52) U.S. Cl.
CPC ............ *G06F 3/017* (2013.01); *G06F 3/0346* (2013.01); *G06V 10/87* (2022.01); *G06V 40/20* (2022.01); *G06V 40/28* (2022.01)

(58) Field of Classification Search
CPC ...... G06F 3/017; G06F 3/0346; G06F 3/0304; G06F 18/285; G06K 9/00335;
(Continued)

(56) References Cited

U.S. PATENT DOCUMENTS 7,289,645 B2 * 10/2007 Yamamoto ............. B60K 37/06
382/104
9,223,415 B1   12/2015 Zhou et al.
(Continued)

FOREIGN PATENT DOCUMENTS

CN   102782612 A   11/2012
CN   104956292 A    9/2015
(Continued)

OTHER PUBLICATIONS

PCT/EP2018/097032, Feb. 28, 2019, International Search Report and Written Opinion.
(Continued)

*Primary Examiner* — Grant Sitta
(74) *Attorney, Agent, or Firm* — Wolf, Greenfield & Sacks, P.C.

(57) ABSTRACT

A mobile device configured to perform gesture recognition for a vehicle information and/or entertainment system comprises a depth camera; an orientation sensor; and a processor configured to detect one or more gestures from images captured by the depth camera according to a gesture detection algorithm; in which the processor is configured to vary the gesture detection algorithm in dependence upon an orientation of the mobile device detected by the orientation sensor.

16 Claims, 8 Drawing Sheets

(51) Int. Cl.
*G06V 40/20* (2022.01)
*G06V 10/70* (2022.01)

(58) Field of Classification Search
CPC ...... G06K 9/6227; G06V 40/20; G06V 10/87; G06V 40/28
See application file for complete search history.

(56) References Cited

U.S. PATENT DOCUMENTS

| | | | | |
|---|---|---|---|---|
| 2009/0184849 | A1* | 7/2009 | Nasiri | A63F 13/211 341/20 |
| 2009/0278915 | A1* | 11/2009 | Kramer | B60K 37/06 348/48 |
| 2010/0050133 | A1* | 2/2010 | Nishihara | G06F 3/0425 715/863 |
| 2011/0221666 | A1* | 9/2011 | Newton | G06F 3/04883 345/156 |
| 2012/0068956 | A1* | 3/2012 | Jira | B60K 37/06 345/174 |
| 2012/0167017 | A1* | 6/2012 | Oh | G06F 3/0488 715/863 |
| 2012/0262372 | A1* | 10/2012 | Kim | G06F 3/0304 345/158 |
| 2013/0155237 | A1* | 6/2013 | Paek | G06F 3/048 348/148 |
| 2013/0261871 | A1* | 10/2013 | Hobbs | B60K 37/06 701/28 |
| 2014/0277936 | A1* | 9/2014 | El Dokor | G06K 9/00355 701/36 |
| 2014/0282278 | A1* | 9/2014 | Anderson | G06F 3/04883 715/863 |
| 2014/0306877 | A1 | 10/2014 | Katz | |
| 2015/0261318 | A1* | 9/2015 | Scavezze | G06F 3/017 345/158 |
| 2015/0277575 | A1* | 10/2015 | Ataee | G06F 3/016 345/156 |
| 2015/0301591 | A1* | 10/2015 | Mueller | H04N 5/33 345/156 |
| 2017/0060254 | A1* | 3/2017 | Molchanov | G06N 3/0454 |
| 2017/0371417 | A1* | 12/2017 | Iyer | G06K 9/00335 |
| 2020/0356177 | A1* | 11/2020 | Lam | G06K 9/00389 |

FOREIGN PATENT DOCUMENTS

| | | |
|---|---|---|
| JP | 2006143159 A | 6/2006 |
| JP | 2012000165 A | 1/2012 |
| JP | 2014135668 A | 7/2014 |
| JP | 20160181286 A | 5/2016 |
| JP | 2019219904 A | 12/2019 |

OTHER PUBLICATIONS

International Search Report and Written Opinion in connection with International Application No. PCT/EP2018/097032, dated Feb. 28, 2019.

[No Author Listed], Car Infotaiment Gesture Control. DepthSense® CARlib for Automotive. Infotainment, Comfort, and Safety. Sony Semiconductor Solutions Corporation. 2017. 1 page.

Francisco Parada-Loira, Elisardo González-Agulla, José L. Alba-Castro. Hand gestures to control infotainment equipment in cars. 2014 IEEE Intelligent Vehicles Symposium Proceedings. IEEE, Jun. 8, 2014. pp. 1-6. https://ieeexplore.ieee.org/document/6856614.

Hasegawa Shuta and Akaike Hideo and Kakuda Hiroyasu, the proposal and evaluation of the control device using the hand gesture in consideration of an attitude. The Information Processing Society of Japan report of research. Japan. Information Processing Society of Japn. Apr. 15, 2012. vol. 2011. Issue: 6. p. HCI-147, No. 24.

* cited by examiner

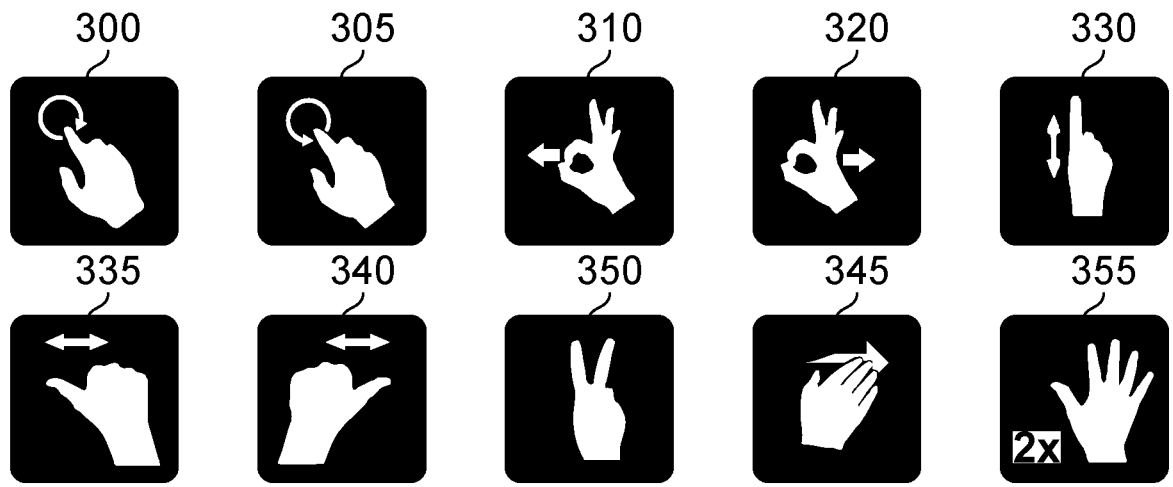
FIG. 3A
- Finger click
- Slide right
- Clamped swipe left
- Clamped swipe right
- Circle clockwise
- Thumb click left
- Thumb click right
- Double five
- Two finger
- Circle counter-clockwise
FIG. 3B
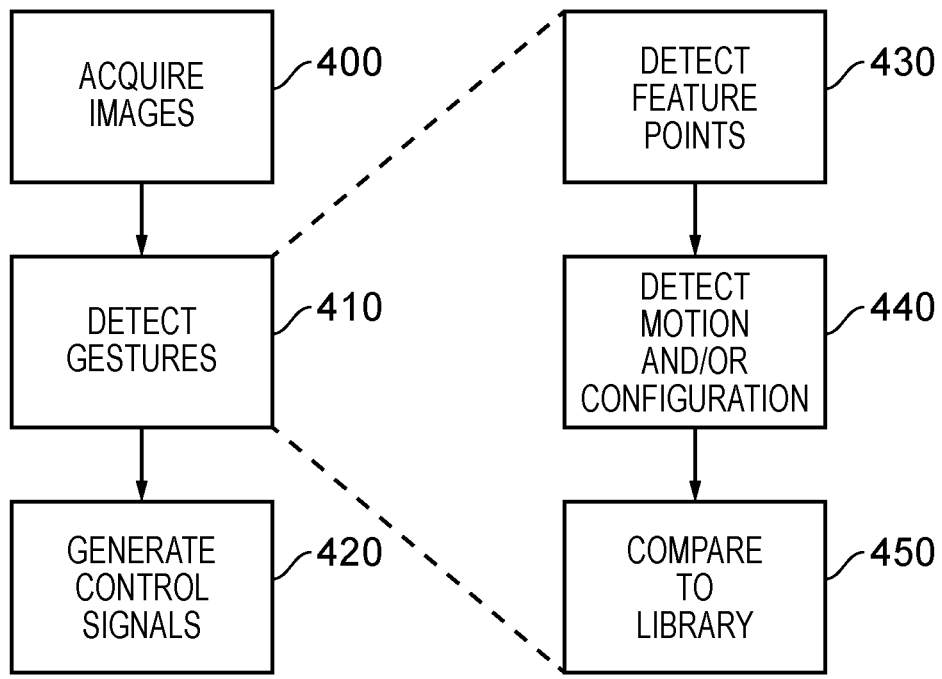
FIG. 4A          FIG. 4B

GESTURE RECOGNITION USING A MOBILE DEVICE

CROSS-REFERENCE TO RELATED APPLICATIONS

This application claims the benefit under 35 U.S.C. § 371 as a U.S. National Stage Entry of International Application No. PCT/EP2018/097032, filed in the European Patent Office as a Receiving Office on Dec. 27, 2018, which claims priority to European Patent Application No. 18150191.7, filed by the European Patent Office on Jan. 3, 2018, each of which is hereby incorporated by reference in its entirety.

BACKGROUND

Field of the Disclosure

This disclosure relates to gesture recognition using a mobile device

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

It has been proposed to use gesture recognition to control one or more operational features of a vehicle information and/or entertainment system.

It has also been proposed to use a mobile device such as a mobile telephone device, equipped with a depth camera, to detect the user gestures.

The foregoing paragraphs have been provided by way of general introduction, and are not intended to limit the scope of the following claims. The described embodiments, together with further advantages, will be best understood by reference to the following detailed description taken in conjunction with the accompanying drawings.

SUMMARY

An example embodiment provides a mobile device configured to perform gesture recognition for a vehicle information and/or entertainment system, the mobile device comprising:

a depth camera;

an orientation sensor; and a processor configured to detect one or more gestures from images captured by the depth camera according to a gesture detection algorithm;

in which the processor is configured to vary the gesture detection algorithm in dependence upon an orientation of the mobile device detected by the orientation sensor.

Another example embodiment provides a gesture recognition system for a vehicle information and/or entertainment system, the system comprising:

a mobile device having a depth camera and an orientation sensor; and a processor configured to detect one or more gestures from images captured by the depth camera according to a gesture detection algorithm;

in which the processor is configured to vary the gesture detection algorithm in dependence upon an orientation of the mobile device detected by the orientation sensor.

Another example embodiment provides a method of operation of a mobile device to perform gesture recognition for a vehicle information and/or entertainment system, the method comprising:

detecting images using a depth camera of the mobile device;

detecting an orientation of the mobile device; and detecting one or more gestures from images captured by the depth camera according to a gesture detection algorithm;

in which the step of detecting one of more gestures comprises varying the gesture detection algorithm in dependence upon an orientation of the mobile device detected by the orientation sensor.

The present disclosure also provides computer software which, when executed by a processor of a mobile device having a depth camera, causes the mobile device to perform the method defined above.

Example embodiments provide a machine-readable, non-transitory storage medium which stores such computer software.

Various other aspects and features of the present disclosure are defined in the appended claims and within the text of the accompanying description and include at least a head mountable apparatus such as a display and a method of operating a head-mountable apparatus as well as a computer program.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, in which:

FIGS. 3a and 3b schematically represent example gestures;

FIGS. 4a and 4b provide a schematic flowchart representing a gesture recognition algorithm;

DESCRIPTION OF THE EMBODIMENTS

Figure 1:
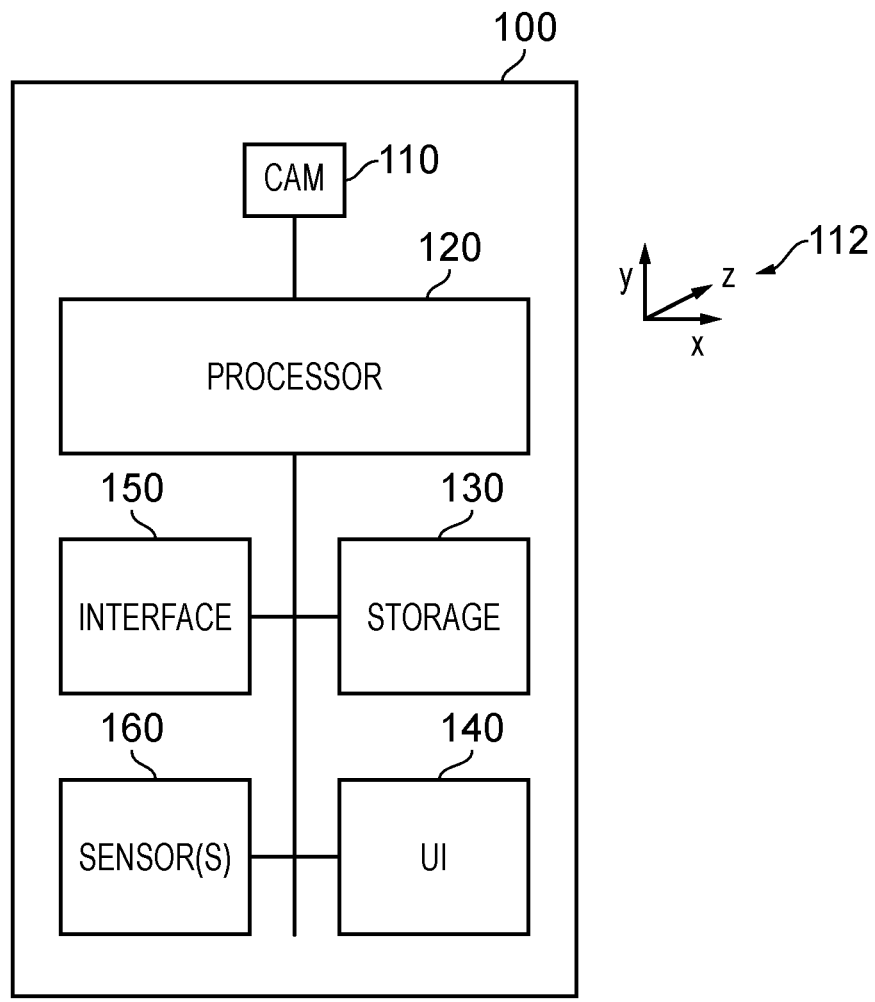
FIG. 1 is a schematic diagram of a mobile device.

FIG. 1 is a schematic diagram of a mobile device such as, for example, a mobile telephone device, although some telephony features have been omitted from FIG. 1 for clarity of the present discussion.

The mobile device 100 comprises a depth camera 110. The depth camera is operable to capture so-called depth images of a field of view, such that as well as capturing image data representing the appearance of the field of view as seen by the depth camera 110, information is also captured representing the depth, which is to say the distance from the camera 110, of each image feature. In this regard, the diagram of FIG. 1 includes a representation 112 of a coordinate system applicable to the depth camera 110, in which an x-axis and a y-axis are in the plane of the mobile device as drawn and a z-axis is perpendicular to that plane, extending in a direction of view of the depth camera 110. The depth information captured by the depth camera can include an indication of a depth or z value for pixels at particular (x, y) positions in a captured image.

The depth camera may be, for example, a so-called time of flight image sensor, a stereoscopic camera, or a structured light camera in which an emitter provides a known pattern of optical illumination, for example a grid of infra-red optical illumination, such that distortions in the captured images of the structured light pattern can indicate the depth of image features. The skilled person will appreciate that other types of depth camera may be used instead.

Referring back to FIG. 1, images captured by the depth camera are provided to a processor 120 operating under the control of program instructions representing computer software stored in storage 130, which may be a non-transitory machine-readable storage medium such as a non-volatile memory. Examples may include a flash memory, a read only memory (ROM) or a magnetic or optical disk storage.

A user interface 140 is provided, for example in the form of a display element (not shown) and a touch panel (not shown). An interface 150 provides a wireless or wired connection to a vehicle information and/or entertainment system. An example of such an interface is a so-called Bluetooth® interface.

Finally with regard to FIG. 1, one or more sensors 160 are provided. Examples of such sensors can include one or more orientation sensors to detect a current orientation of the mobile device. For example, these may include one or more sensors selected from the list consisting of: a gyroscopic sensor, an accelerometer, a gravity sensor, and a magnetic field sensor.

As discussed above, the mobile device of FIG. 1 is connectable by a wired or wireless connection to a vehicle information and/or entertainment system to be discussed below, such that the mobile device 100 provides an example of a mobile device configured to perform gesture recognition for vehicle information and/or entertainment system, the mobile device comprising a depth camera 110, an orientation sensor 160 and a processor 120 configured to detect one or more gestures from images captured by the depth camera 110 according to a gesture detection algorithm. Using techniques to be discussed below, the processor 110 is configured to vary the gesture detection algorithm (for example, by selecting a different algorithm or version of the algorithm and/or by varying parameters of the algorithm in use) in dependence upon an orientation of the mobile device 100 as detected by the orientation sensor 160.

Figure 2:
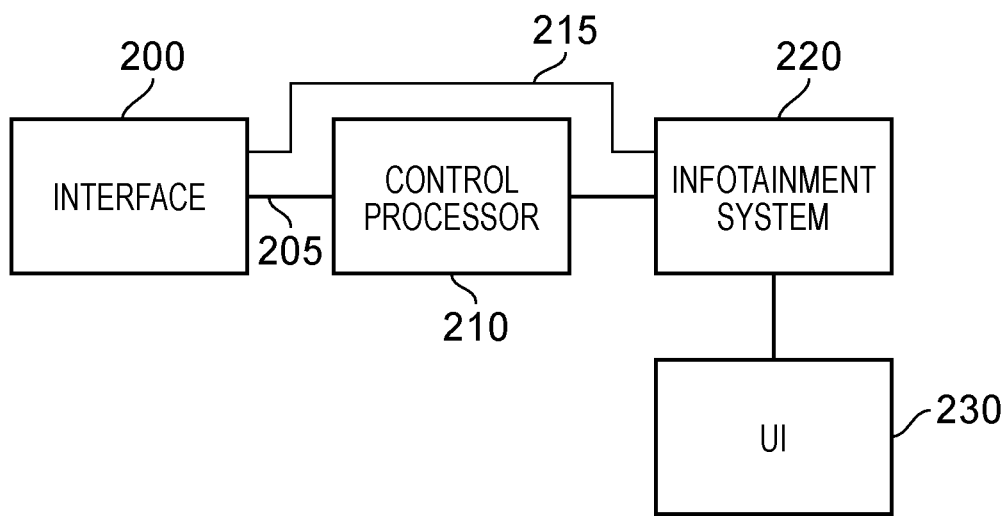
FIG. 2 is a schematic diagram of a vehicle information and/or entertainment system.

FIG. 2 is a schematic diagram of a vehicle information and/or entertainment system comprising an interface 200 to cooperate with the interface 150 of the mobile device 100 and, in at least some examples, to receive control signals generated by the processor 120 of the mobile device 100. These control signals 205 are passed to a control processor 210 which controls the operation of a so-called "infotainment" system 220 generating information and/or entertainment for presentation to a user by a user interface 230 such as a display screen and/or one or more loudspeakers.

The interface 200 may also be a Bluetooth® wireless interface. It is noted that the interface 200 may also be used to receive audio signals 215 from the mobile device 100, for example music or telephony signals, which do not represent control signals themselves and can be passed directly to the infotainment system 220, for example for output to the user.

The arrangement of FIG. 2 therefore comprises an example of a vehicle information and/or entertainment apparatus comprising an information and/or entertainment system 220 configured to receive (via the interface 200) control signals from the mobile device 100 and to vary (by the control processor 210) the operation of the information and/or entertainment system according to the received control signals.

As discussed, therefore, the mobile device 100 or FIG. 1 and the vehicle information and/or entertainment system of FIG. 2 each comprise a respective interface such as a wireless interface 150, 200 to communicate the control signals between the mobile device 100 and the vehicle information and/or entertainment system.

Examples of the way in which gestures can be used to control the infotainment system 220 include matters such as the adjustment of audio volume, changing radio channels, initiating a phone call, altering air conditioning settings or the like. A gesture based system is considered to be well suited to the driver of a vehicle being able to control the various vehicle systems without losing concentration by having to search for physical controls or touch screen menu options.

FIGS. 3a and 3b schematically illustrate and represent example gestures which can be detected and recognised by the mobile device of FIG. 1. In particular, FIG. 3a provides a graphical representation of a plurality of gestures and FIG. 3b provides a list of terminology associated with the set of gestures. Several of the gestures involve detecting motion of the user's hand such as 300, 305, 310, 320, 330, 335, 340, 345. Other gestures can involve detecting a static configuration of the user's hand such as gestures 350, 355.

FIGS. 4a and 4b provide a schematic flow chart representing an example gesture recognition algorithm. At a step 400, depth images are acquired by the depth camera 110 of the mobile device 110. A step 410 is a gesture detection step which will be discussed in more detail below, and a step 420 involves generating control signals, for example for supply to the infotaintment system, in dependence upon the detected gestures. A further example of such a gesture detection and/or recognition technique is disclosed in WO2015/104257 A1, the contents of which are incorporated by reference into the present description.

In FIG. 4b, the step 410 is shown in more detail, such that at a step 430, so-called feature points such as fingertips and the like are detected in the captured images. At a step 440, motion and/or configuration of the feature points is detected, and at a step 450 the detected motion and/or configuration are configured to a library in which examples of motion and/or configuration of feature points are indicative of particular gestures.

Figure 6:
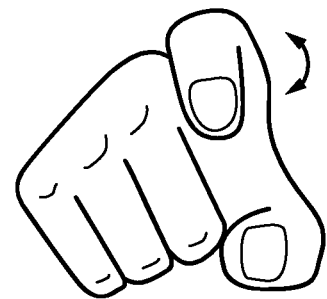
Figure 7:
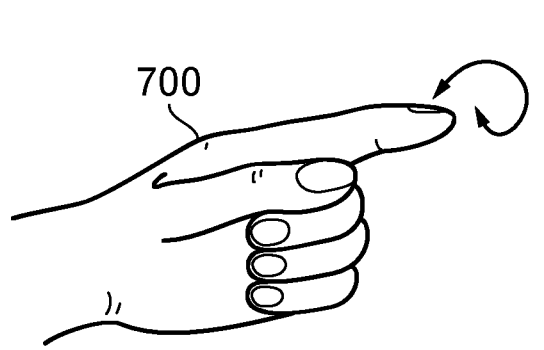
FIG. 7 schematically represents a plurality of possible views of a hand gesture depending on the location and orientation of a mobile device.
Figure 7:
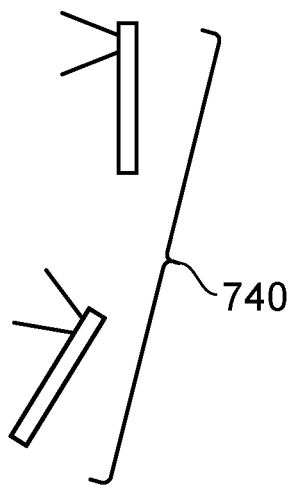
Figure 7:
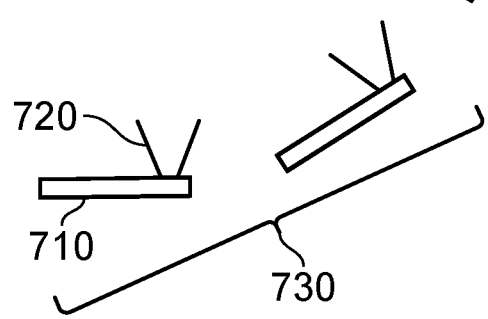

Considering for example the gestures 300, 305, these will be discussed in more detail with reference to FIGS. 5 to 7.

Figure 5:
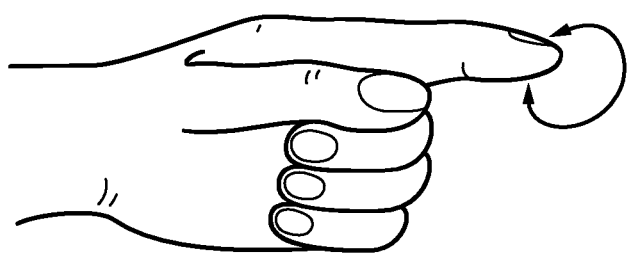
FIGS. 5 and 6 schematically represent different views of a hand gesture.

FIG. 5 represents a side view of a user's hand in a pointing configuration, making a generally circular movement of the index finger. FIG. 6 represents the same hand making the same movement but viewed along the axis of the index finger.

In the context of a system operating in a vehicle, the user has a generally fixed location, being confined by the location of the driver's or passenger's seat, but the mobile device 100 can take various different locations within the vehicle, for example being positioned between the two front seats in a generally horizontal upward-facing orientation or being mounted to a window or air vent mount in a rearward facing orientation. However, it is desirable that the user of the system does not have to vary his or her gesture to achieve the same control result, simply because the mobile device 100 is in a different location. This issue is illustrated in more detail in FIG. 7 which shows the user's hand 700 trying to execute a consistent gesture, but a plurality of possible locations for a mobile device 710 and its associated field of view 720 from a low-down upward-looking orientation to a higher rearward looking orientation.

In a vehicle environment, the position and orientation are somewhat linked together, given that there is generally a limited range of places in which the user can stow or mount a mobile device (for example, between the front seats facing upwards, on a vent or windscreen mount, or the like, such that at each location, the user will fully appreciate that the orientation of the device needs to be towards the user if the user is to detected making hand gestures.

To address the issue of allowing the user to make a consistent gesture but still to be able to detect and recognise that gesture even if the mobile device 100 is in a different location and orientation, the processor 120 can be configured to vary the detection algorithm in dependence upon an orientation of the mobile device as detected by the orientation sensor 160. For example, it may be that two or more gesture detection algorithms are provided, one which is more suited to a range 730 of locations and orientations of the mobile device 710 and one which is more suited to a range 740 of locations and orientations of the mobile device 710. Within a respective range 730, 740 of positions and orientations (or where only one algorithm is provided, across the whole range (730 plus 740) of positions and orientations, calibration data can be used to calibrate, for example, the expected views by the depth camera of the hand undertaking a gesture to be recognised.

Figure 8:
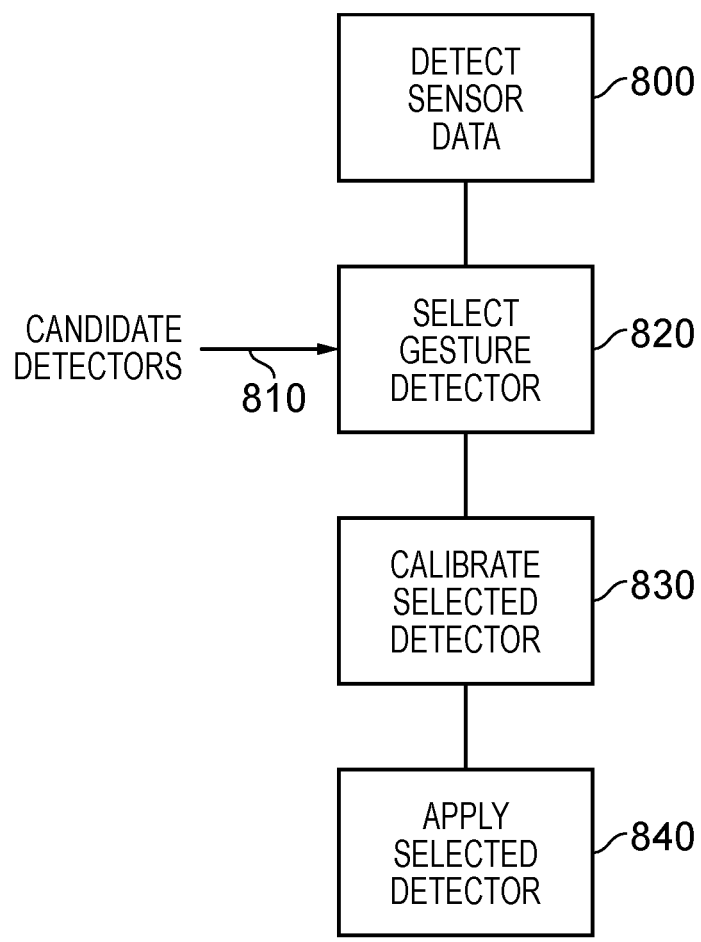
FIG. 8 is a schematic flowchart representing the varying of a gesture recognition algorithm.

FIG. 8 is an example flow chart schematically representing this process.

At a step 800, the processor 120 detects orientation data from the sensor 160.

If there are a plurality of candidate detection algorithms 810 available for use by the processor 120, each suitable (for example) to a sub-range of orientations of the mobile device, then at a step 820 the processor 120 selects a gesture detection algorithm or gesture detector from amongst the candidate detectors 810. At a step 830, the processor 120 calibrates the selected detection algorithm, which is to say varies its settings or parameters according to the detected orientation. At a step 840, the processor 120 applies the selected gesture detection algorithm.

Therefore the step 820 provides an example of an arrangement in which the processor 120 is configured to select between two or more candidate gesture detection algorithms according to the orientation of the mobile device detected by the orientation sensor.

The step 830, which can be used with or without the step 820, provides an example in which the processor 120 is configured to vary a calibration parameter of the gesture detection algorithm, or in the case of the use of the step 820, the selected gesture detection algorithm) according to the orientation of the mobile device as detected by the orientation sensor.

Figure 9:
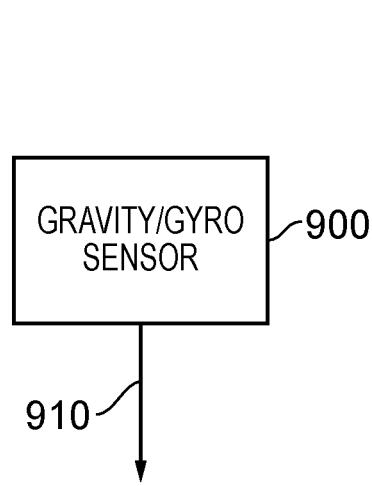
FIGS. 9 and 10 schematically represent the use of orientation sensors.
Figure 10:
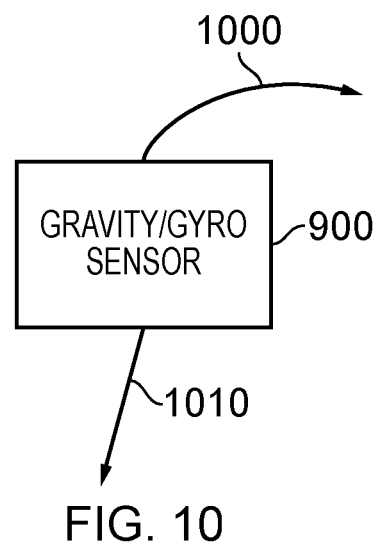

FIGS. 9 and 10 schematically represent the use of orientation sensors, with particular technical reference to an in-vehicle system. In FIG. 9, an orientation sensor 900 detects the orientation of the mobile device 100 relative to a gravity or downwards vector 910, so as to provide an indication of the orientation of the device relative to the vector 910. This can be performed, for example, a gravity, acceleration or gyroscopic sensor.

Consider then the situation in which the vehicle executes a sharp turn, or accelerates or decelerates very sharply. An example sharp turn is illustrated by an arrow 1000 in FIG. 10. In this situation, the detected gravity vector will tend to skew from actual vertical, for example at an angle represented by a vector 1010. This could in principle be erroneously detected by the process of FIG. 8 as a change in orientation of the mobile device 100, leading to a variation in the gesture detection algorithm as discussed above. Various measures can be provided to avoid this occurring.

In one example, the processor 120 is configured to vary the gesture detection algorithm less frequently than an image capture rate of the depth camera, for example no more frequently then every n captured images, where n may be for example 100.

In addition, or as an alternative, the processor 120 may be configured to apply a smoothing operation such as a low pass filtering process to variations of the gesture detection algorithm, so that for example the detected orientation is smoothed or low pass filtered (for example, with a time constant of a few seconds, for example 60 seconds, which is considered longer than a typical sharp turn takes to execute in a vehicle) and the smoothed detected orientation is applied to control the variation of the gesture detection algorithm.

To achieve these arrangements the processor 120 can act under program instruction control to implement a filter and/or delay operation with respect to the detections of orientation and/or the variations to be applied to the detection algorithm.

Another example arrangement will be described with reference to FIGS. 11 and 12, again with particular technical reference to an in-vehicle system where the device's environment will tend to be fixed (rather than a free space or room-based system where the environment could be subject to many more variations).

Figure 11:
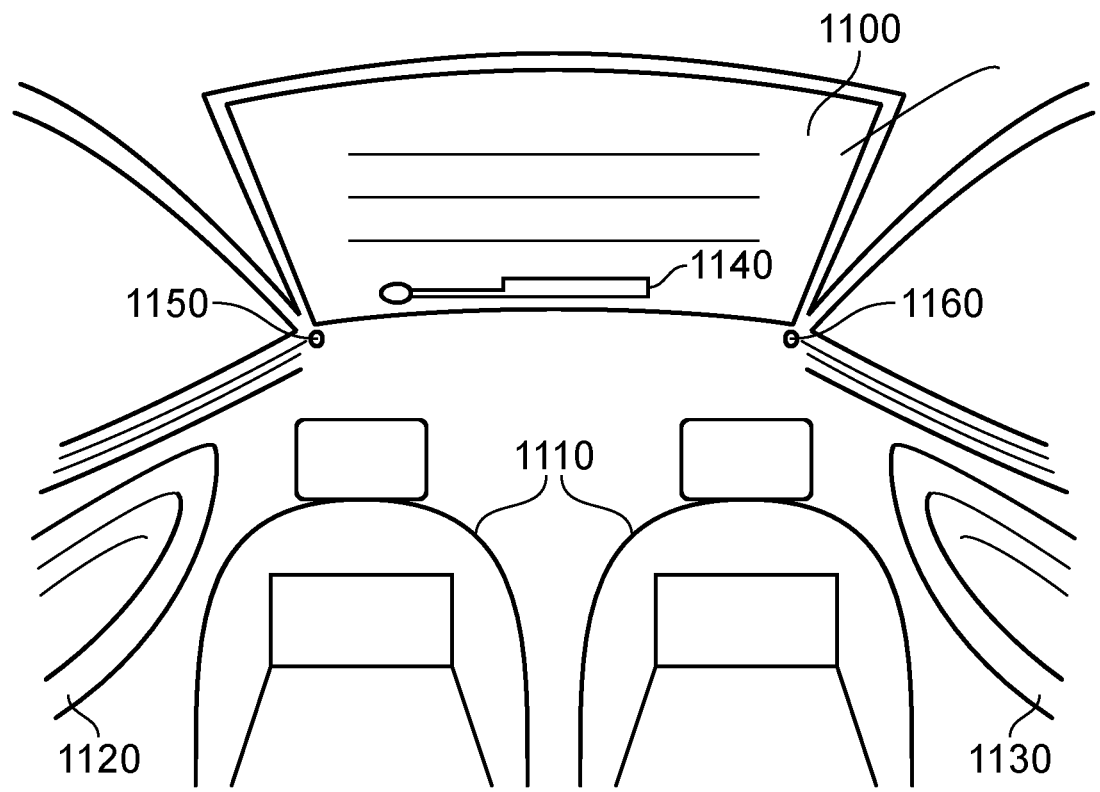
FIG. 11 schematically represents a vehicle interior as seen by a depth camera of a mobile device.

FIG. 11 schematically represents an example vehicle interior as seen by a depth camera of a mobile device mounted in a generally rearward direction, in a mounting position towards the front of a vehicle. Here, the rear window 1100 and the driver and passenger seats 1110 can be seen (the driver and passenger being omitted for clarity), along with the vehicle doors, 1120, 1130. Using these captured images which relate to items which do not move relative to the camera as long as the camera remains at the same position and orientation, or in other words the background, a so-called optical flow technique can be used to confirm or reject orientation changes detected by the orientation sensor 160. In other words, if an orientation change is detected but it is inconsistent with image motion of the background image, the change can be rejected.

It is not necessary to detect motion of the entire background; particular in-vehicle features could be used as reference points or markers (such as a rear wiper 1140) or one or more (preferably two or more spaced apart) beacons such as continuous or pulse-coded infra-red emitters 1150, 1160 could be provided within the vehicle for use as optical flow reference points.

It can in fact be considered that such an optical flow technique represents one of (or the only) orientation sensing arrangement(s), so that the orientation sensor can be considered to comprise a detector to detect changes in an image location of objects within the vehicle in the images captured by the depth camera.

For example, the processor may be configured to detect whether a change in orientation detected by the orientation sensor is consistent with a change in image location of one or more objects within the vehicle within the images captured by the depth camera.

Figure 12:
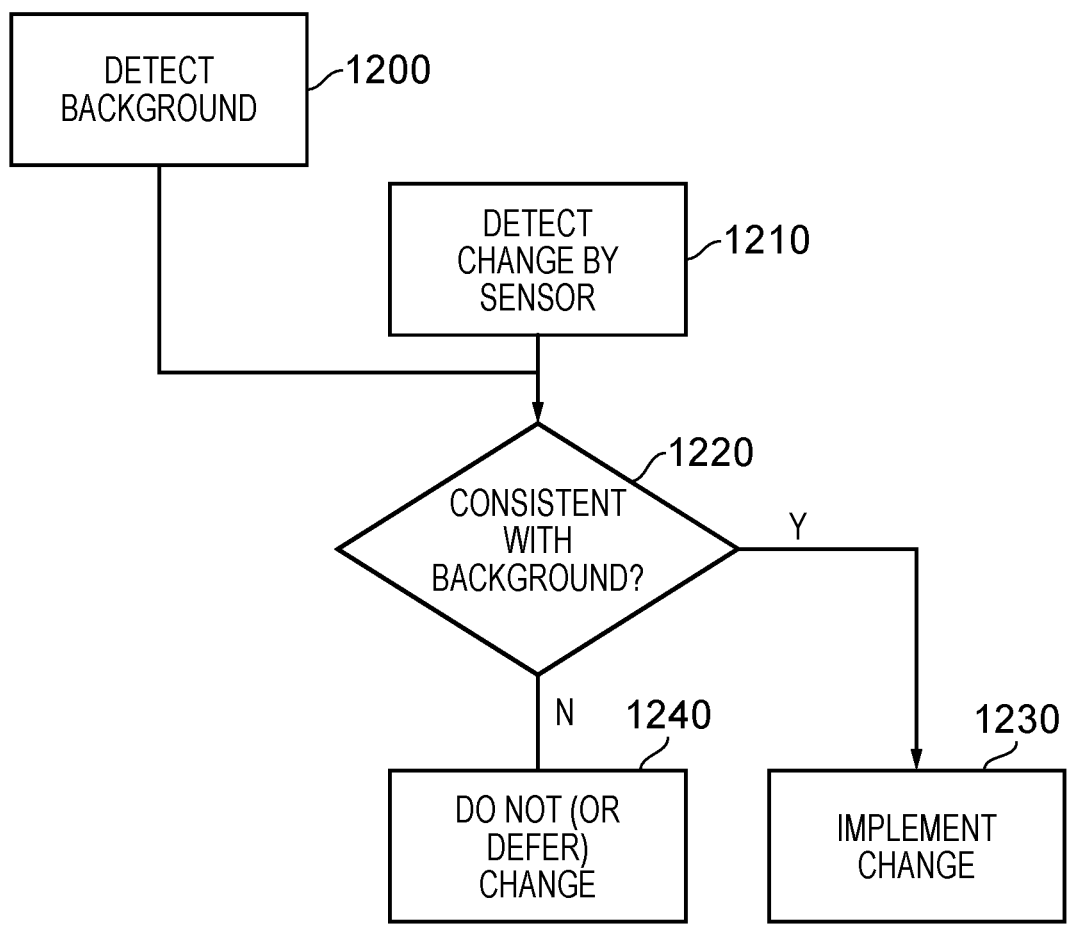
FIG. 12 is a schematic flowchart illustrating a method of orientation detection.

FIG. 12 is a schematic flow chart illustrating an example of such a technique.

At a step 1200, the processor 120 detects a background portion of the captured images, for example as a portion (which may in practice be the majority of the captured images which does not substantially change from image to image over a period of for example 20 images. A step 1210 represents the detection of an orientation change by the sensor 160 corresponding to the step 800 of FIG. 8.

At a step 1220, the processor 120 detects whether the detected orientation change by the sensor is consistent with any changes or lack of changes detected in the background portion of the captured images. If the outcome is yes then the detected change by the sensor is accepted and implemented at a step 1230. If the answer is no then the detected change is either rejected or deferred for implementation when confirmed later at a step 1240.

Figure 13:
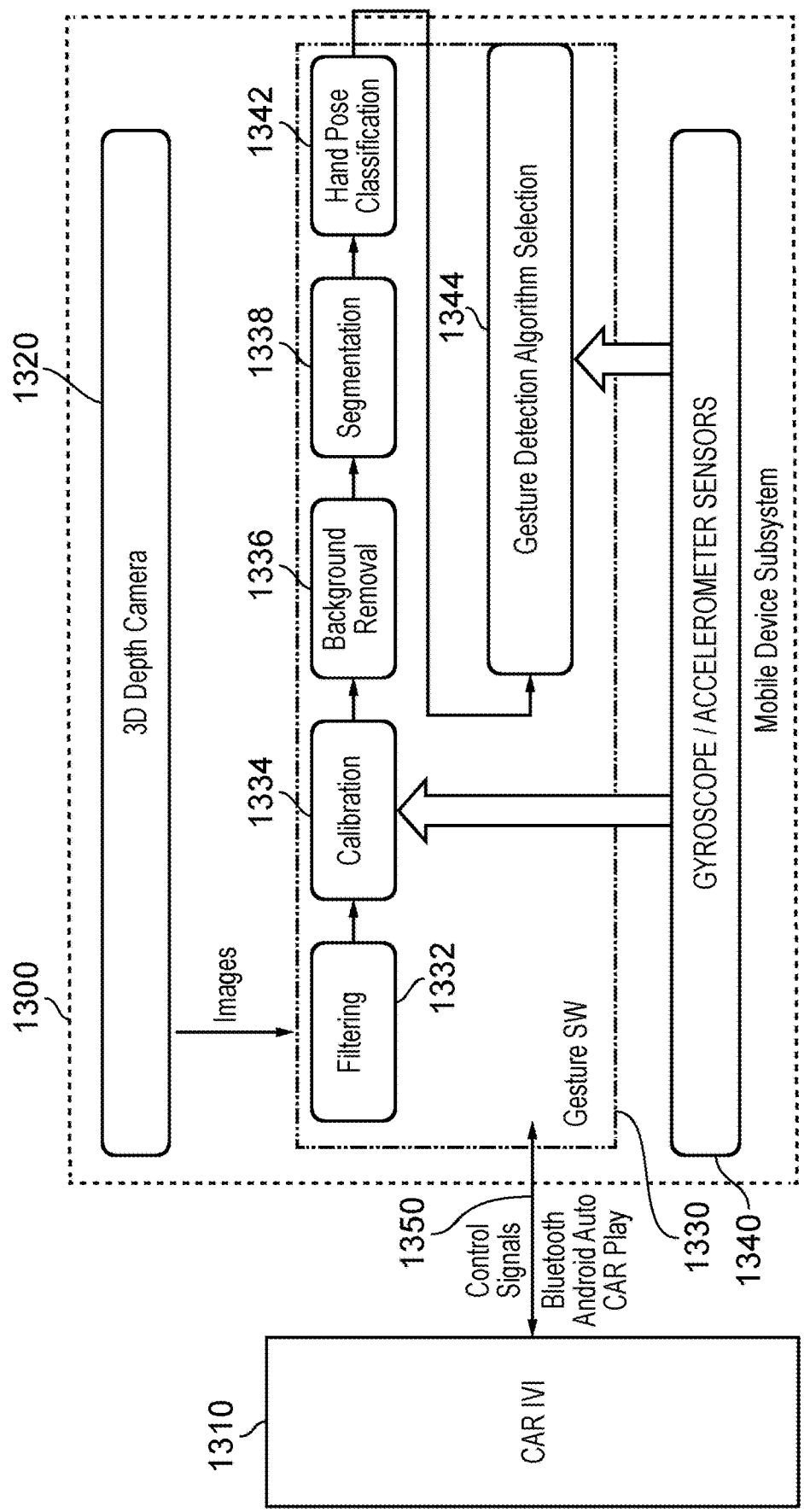
FIG. 13 schematically illustrates a mobile device and a vehicle information and/or entertainment system.

FIG. 13 schematically illustrates a mobile device 1300 and a vehicle information and/or entertainment system ("IVI" or "in-vehicle infotainment" [information and/or entertainment] system) 1310. As discussed above, a depth camera 1320 communicates with software 1330 running on the processor 120 of FIG. 1, which is also responsive to signals from sensors 1340 corresponding to the sensors 160 of FIG. 1. The images from the depth camera are subject to filtering 1332, calibration 1334, background removal 1336, segmentation 1338 and hand pose classification 1342 to provide an input to the selected gesture detection algorithm selection 1344. The gesture detection algorithm includes at least the hand pose classification 1342. Based on the detected gesture, control signals 1350 are communicated, for example by a wireless communication link to the IVI 1310.

Note that in other examples, the mobile device could be used simply to capture the depth images for transmission (for example, by the interfaces 150/200) to the vehicle information and/or entertainment system, where the gesture recognition takes place. The mobile device would also need to capture its orientation so that variations of the gesture detection algorithm may be made as discussed above. In this regard, embodiments of the present disclosure encompass a gesture recognition system for a vehicle information and/or entertainment system, the system comprising: a mobile device having a depth camera and an orientation sensor; and a processor configured to detect one or more gestures from images captured by the depth camera according to a gesture detection algorithm; in which the processor is configured to vary the gesture detection algorithm in dependence upon an orientation of the mobile device detected by the orientation sensor. Note that the processor can be physically part of the IVI or the mobile device, and/or the processing tasks can be shared between the two devices.

Figure 14:
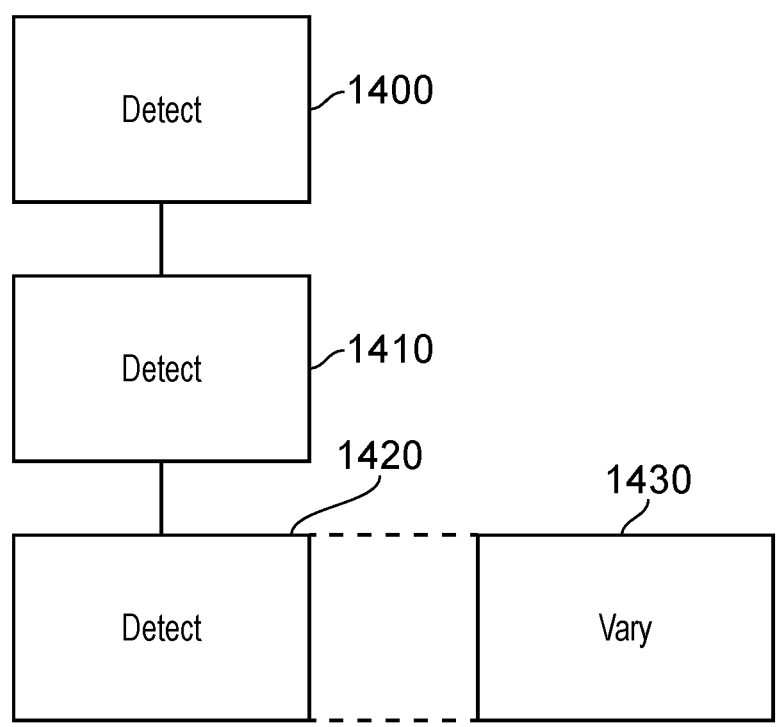
FIG. 14 is a schematic flowchart illustrating a method.

FIG. 14 is a schematic flowchart illustrating a method of operation of a mobile device to perform gesture recognition for a vehicle information and/or entertainment system, the method comprising:

detecting (at a step 1400) images using a depth camera of the mobile device;

detecting (at a step 1410) an orientation of the mobile device; and detecting (at a step 1420) one or more gestures from images captured by the depth camera according to a gesture detection algorithm;

in which the step of detecting one of more gestures comprises varying 1430 the gesture detection algorithm in dependence upon an orientation of the mobile device detected by the orientation sensor.

As discussed, the above method can be performed by the processor 120 of the mobile device of FIG. 1, according to software stored in the storage 130 of FIG. 1.

It will be appreciated that example embodiments can be implemented by computer software operating on a general purpose computing system such as a games machine. In these examples, computer software, which when executed by a computer, causes the computer to carry out any of the methods discussed above is considered as an embodiment of the present disclosure. Similarly, embodiments of the disclosure are provided by a non-transitory, machine-readable storage medium which stores such computer software.

It will also be apparent that numerous modifications and variations of the present disclosure are possible in light of the above teachings. It is therefore to be understood that within the scope of the appended claims, the disclosure may be practised otherwise than as specifically described herein.

Respective aspects and features of embodiments of the present disclosure are defined by the following numbered clauses:

1. A mobile device configured to perform gesture recognition for a vehicle information and/or entertainment system, the mobile device comprising:
    a depth camera;
    an orientation sensor; and
    a processor configured to detect one or more gestures from images captured by the depth camera according to a gesture detection algorithm;
    in which the processor is configured to vary the gesture detection algorithm in dependence upon an orientation of the mobile device detected by the orientation sensor.
2. A mobile device according to clause 1, in which the processor is configured to select between two or more candidate gesture detection algorithms according to the orientation of the mobile device detected by the orientation sensor.
3. A mobile device according to clause 2, in which the processor is configured to vary a calibration parameter of the selected gesture detection algorithm according to the orientation of the mobile device detected by the orientation sensor.
4. A mobile device according to clause 1, in which the processor is configured to vary a calibration parameter of the gesture detection algorithm according to the orientation of the mobile device detected by the orientation sensor.
5. A mobile device according to any one of the preceding clauses, in which the depth camera comprises a sensor selected from the list consisting of:
    a time of flight image sensor;
    a stereoscopic camera; and
    a structured light camera.
6. A mobile device according to any one of the preceding clauses, in which the orientation sensor comprises one or more sensors selected from the list consisting of:
    a gyroscopic sensor;

an accelerometer sensor;
a gravity sensor; and
a magnetic field sensor.

7. A mobile device according to any one of the preceding clauses, in which the processor is configured to detect whether a change in orientation detected by the orientation sensor is consistent with a change in image location of one or more objects within the vehicle within the images captured by the depth camera.

8. A mobile device according to any one of clauses 1 to 5, in which the orientation sensor comprises a detector to detect changes in an image location of objects within the vehicle in the images captured by the depth camera.

9. A mobile device according to any one of the preceding clauses, in which the processor is configured to vary the gesture detection algorithm less frequently than an image capture rate of the depth camera.

10. A mobile device according to any one of the preceding clauses, in which the processor is configured to apply a smoothing to variations of the gesture detection algorithm.

11. A mobile device according to any one of the preceding clauses, in which the processor is configured to generate control signals for the vehicle information and/or entertainment system in dependence upon the detected gestures.

12. A mobile device according to clause 11, comprising:
a wireless interface to communicate the control signals with the vehicle information and/or entertainment system.

13. Vehicle information and/or entertainment apparatus comprising:
a mobile device according to any one of clauses 1 to 11 and operable to generate control signals dependent upon one or more detected gestures;
an information and/or entertainment system configured to receive the control signals and to vary the operation of the information and/or entertainment system according to the received control signals.

14. Apparatus according to clause 13, in which the mobile device and the vehicle information and/or entertainment system each comprise a respective wireless interface to communicate the control signals between the mobile device and the vehicle information and/or entertainment system.

15. A gesture recognition system for a vehicle information and/or entertainment system, the system comprising:
a mobile device having a depth camera and an orientation sensor; and
a processor configured to detect one or more gestures from images captured by the depth camera according to a gesture detection algorithm;
in which the processor is configured to vary the gesture detection algorithm in dependence upon an orientation of the mobile device detected by the orientation sensor.

16. A method of operation of a mobile device to perform gesture recognition for a vehicle information and/or entertainment system, the method comprising:
detecting images using a depth camera of the mobile device;
detecting an orientation of the mobile device; and
detecting one or more gestures from images captured by the depth camera according to a gesture detection algorithm;
in which the step of detecting one or more gestures comprises varying the gesture detection algorithm in dependence upon an orientation of the mobile device detected by the orientation sensor.

17. Computer software which, when executed by a processor of a mobile device having a depth camera, causes the mobile device to perform the method of clause 16.

18. A non-transitory machine-readable storage medium which stores computer software according to clause 17.

The invention claimed is:

1. A mobile device configured to perform gesture recognition for a vehicle information and/or entertainment system within a vehicle, the mobile device comprising:
a depth camera configured to capture one or more images;
an orientation sensor configured to detect an orientation of the mobile device; and
a processor configured to:
select, from among two or more candidate gesture algorithms, a gesture detection algorithm for detecting one or more gestures, wherein the selection is based, at least in part, on the orientation of the mobile device as detected by the orientation sensor; and
detect, using the one or more images captured by the depth camera provided as input to the selected gesture detection algorithm, one or more gestures;
wherein the processor is further configured to varying a calibration parameter of the selected gesture detection algorithm.

2. A mobile device according to claim 1, in which the depth camera comprises a sensor selected from the list consisting of:
a time of flight image sensor;
a stereoscopic camera; and
a structured light camera.

3. A mobile device according to claim 1, in which the orientation sensor comprises one or more sensors selected from the list consisting of:
a gyroscopic sensor;
an accelerometer sensor;
a gravity sensor; and
a magnetic field sensor.

4. A mobile device according to claim 1, in which the processor is configured to detect whether a change in orientation detected by the orientation sensor is consistent with a change in image location of one or more objects within the vehicle within the one or more images captured by the depth camera.

5. A mobile device according to claim 1, in which the orientation sensor comprises a detector configured to detect changes in an image location of objects within the vehicle in the one or more images captured by the depth camera.

6. A mobile device according to claim 1, in which the processor is configured to select the gesture detection algorithm less frequently than an image capture rate of the depth camera.

7. A mobile device according to claim 6, in which the processor is configured to apply a smoothing to variations of the selected gesture detection algorithm.

8. A mobile device according to claim 1, in which the processor is configured to generate control signals for the vehicle information and/or entertainment system in dependence upon the detected one or more gestures.

9. A mobile device according to claim 8, comprising:
a wireless interface to communicate the control signals with the vehicle information and/or entertainment system.

10. Vehicle information and/or entertainment apparatus comprising:

a mobile device according to claim 1 and operable to generate control signals dependent upon the detected one or more gestures;

an information and/or entertainment system configured to receive the control signals and to vary operation of the vehicle information and/or entertainment system according to the received control signals.

11. Apparatus according to claim 10, in which the mobile device and the vehicle information and/or entertainment system each comprise a respective wireless interface to communicate the control signals between the mobile device and the vehicle information and/or entertainment system.

12. A gesture recognition system for a vehicle information and/or entertainment system within a vehicle, the system comprising:

a mobile device having a depth camera configured to capture one or more images and an orientation sensor configured to detect an orientation of the mobile device; and a processor configured to:
  select, from among two or more candidate gesture algorithms, a gesture detection algorithm for detecting one or more gestures, wherein the selection is based, at least in part, on the orientation of the mobile device as detected by the orientation sensor; and
  detect, using the one or more images captured by the depth camera provided as input to the selected gesture detection algorithm, one or more gestures;
  wherein the processor is further configured to varying a calibration parameter of the selected gesture detection algorithm.

13. A method of operation of a mobile device to perform gesture recognition for a vehicle information and/or entertainment system within a vehicle, the method comprising:

capturing one or more images using a depth camera of the mobile device;

detecting an orientation of the mobile device;

selecting, from among two or more candidate gesture algorithms, a gesture detection algorithm for detecting one or more gestures, wherein the selection is based, at least in part, on the detected orientation of the mobile device;

detecting, using the one or more images captured by the depth camera provided as input to the selected gesture detection algorithm, one or more gestures; and wherein the processor is further configured to varying a calibration parameter of the selected gesture detection algorithm.

14. A non-transitory machine-readable storage medium which stores computer software which, when executed by a processor of a mobile device having a depth camera, causes the mobile device to perform the method of claim 13.

15. A mobile device according to claim 1, wherein each of the two or more candidate gesture algorithms is associated with a range of orientations of the mobile device.

16. A mobile device according to claim 1, wherein the processor is further configured to vary the calibration parameter for the selected gestured detection algorithm prior to detecting the one or more gestures.

\* \* \* \* \*